United States Patent [19]

Erickson

[11] Patent Number: 4,726,269

[45] Date of Patent: Feb. 23, 1988

[54] TOOLHOLDER ASSEMBLY

[75] Inventor: Robert A. Erickson, Raleigh, N.C.

[73] Assignee: Kennametal Inc., Latrobe, Pa.

[21] Appl. No.: 7,311

[22] Filed: Jan. 27, 1987

[51] Int. Cl.⁴ .............................................. B23B 29/00
[52] U.S. Cl. ..................................... 82/36 B; 403/322; 407/46; 407/101
[58] Field of Search ................. 82/36 B, 36 R, 36 A; 409/232–234; 403/322, 374; 407/46; 279/101, 1 B; 408/238, 239 R, 239 A

[56] References Cited

U.S. PATENT DOCUMENTS

| | | | |
|---|---|---|---|
| 1,119,528 | 12/1914 | Nieman . | |
| 2,970,844 | 2/1961 | Better | 279/75 |
| 2,990,188 | 6/1961 | Better et al. | 279/75 |
| 3,115,798 | 12/1963 | Donaway | 82/34 |
| 3,498,653 | 3/1970 | McCreery et al. | 287/119 |
| 3,851,562 | 12/1974 | Tomita et al. | 20/11 A |
| 4,018,112 | 4/1977 | Heaton et al. | 82/1 C |
| 4,068,559 | 1/1978 | Schmid et al. | 90/11 D |
| 4,122,755 | 10/1978 | Johnson et al. | 90/11 A |
| 4,131,054 | 12/1978 | Johnson et al. | 90/11 |
| 4,135,418 | 1/1979 | McCray et al. | 82/36 A |
| 4,197,771 | 4/1980 | Heaton et al. | 82/36 B |
| 4,228,705 | 10/1980 | Heisner | 82/36 |
| 4,270,422 | 6/1981 | Andersson | 82/36 R |
| 4,292,866 | 10/1981 | Kaczynski | 82/36'R |
| 4,350,463 | 9/1982 | Friedline | 409/234 |
| 4,406,195 | 9/1983 | Kruger et al. | 82/36 |
| 4,573,824 | 3/1986 | Ehle | 403/322 |
| 4,575,293 | 3/1986 | Berti | 409/234 |
| 4,604,012 | 8/1986 | Kawasaki et al. | 409/233 |
| 4,680,999 | 7/1987 | Kojima et al. | 82/36 B |

FOREIGN PATENT DOCUMENTS

| | | |
|---|---|---|
| 0061075 | 9/1982 | European Pat. Off. . |
| 0123156 | 10/1984 | European Pat. Off. . |
| 233321 | 2/1986 | German Democratic Rep. ............ 407/101 |
| 1333872 | 10/1973 | United Kingdom . |
| 1456611 | 11/1976 | United Kingdom . |
| 2154479 | 9/1985 | United Kingdom . |

Primary Examiner—Gil Weidenfeld
Assistant Examiner—Steven C. Bishop
Attorney, Agent, or Firm—John J. Prizzi

[57] ABSTRACT

The invention relates to a toolholder assembly. The toolholder has a tubular shank at one end for mounting into the bore of a support member. The shank has at least two circumferentially spaced perforations in its tubular wall. Each of the bores extends obliquely toward the rear of the shank as it extends from the outer to the inner surface of the tubular wall. A locking element is located partially within each of said perforations an the recess formed by the inner surface of the tubular shank. An actuating mechanism is located within the recess to drive the locking elements outwardly against the perforation walls, thereby expanding the rear of the tubular shank to lock the shank in the support member bore.

20 Claims, 5 Drawing Figures

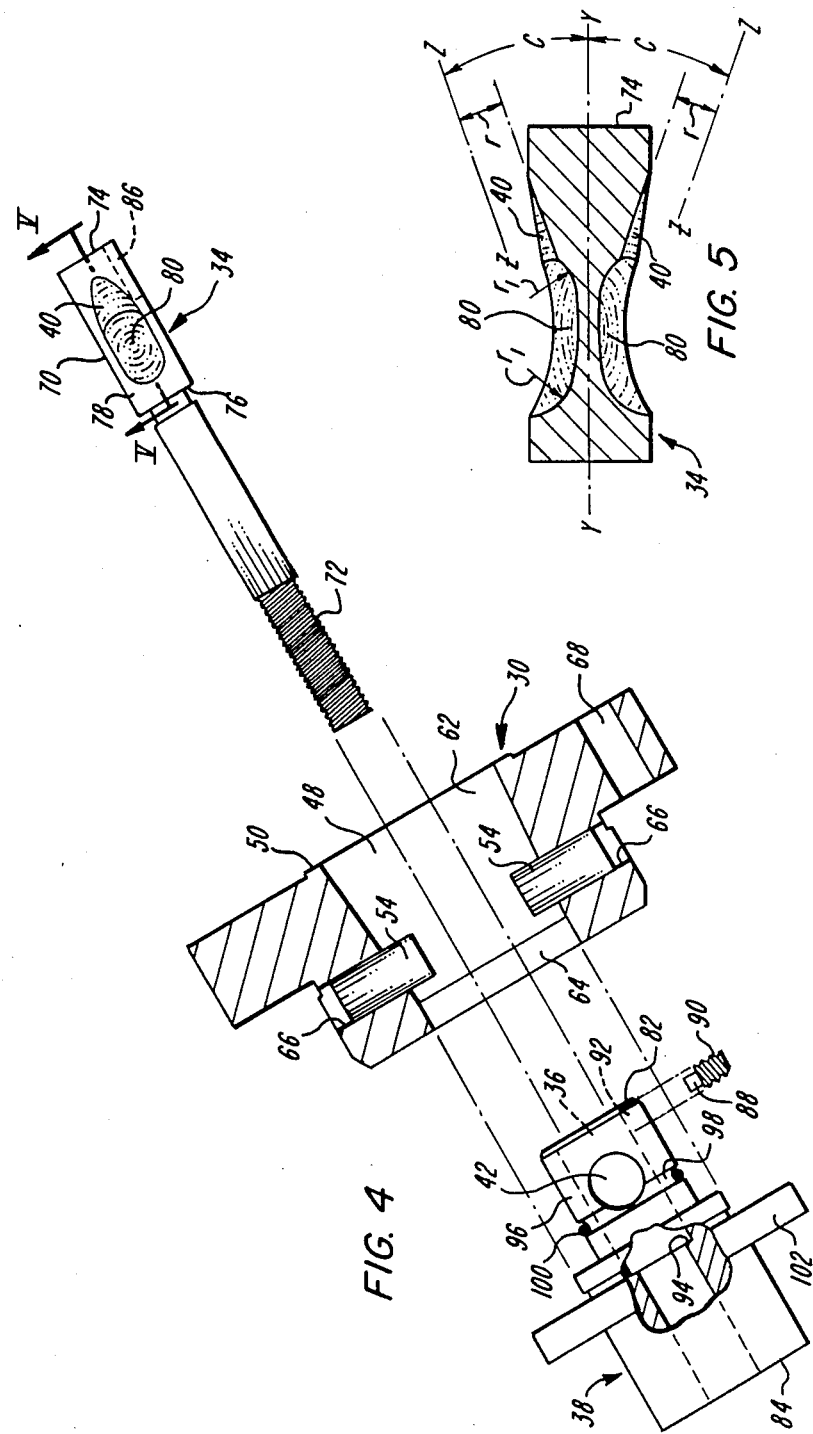

TOOLHOLDER ASSEMBLY

BACKGROUND OF THE INVENTION

This invention relates to toolholders and their locking mechanisms. It is especially concerned with a toolholder assembly including a body having a shank receivable in the bore of a tool support member. Such tools are used in the cutting and shaping of workpieces where it is important that the toolholder be mounted in a rigid manner so that both movement and vibration are minimized during the metalcutting operation.

Many devices in the prior art have proven to be successful in this regard and are exemplified by McCreery U.S. Pat. No. 3,498,653; McCray et al U.S. Pat. No. 4,135,418; Heaton et al U.S. Pat. No. 4,197,771; and Friedline U.S. Pat. No. 4,350,463. The foregoing devices are concerned with the use of ball-like elements to hold the shank of a toolholder in the bore of the tool support member.

One drawback common to the foregoing designs is the feature that the locking elements in each must abut against at least one surface during locking that is not similar in size and shape to the locking element abutment surface. This produces small contact areas with high contact stresses leading to plastic deformation of the locking elements and the surfaces they abut against each time the toolholder is locked onto a support member. After many repeated uses the deformation in the locking elements and the surfaces they abut against can lead to a reduction in the rigidity of the toolholder, thus shortening its useful lifetime.

There is, therefore, clearly a need for a toolholder and a toolholder assembly design which has a longer lifetime. This design must, however, be capable of being easily and accurately manufactured. It should also be capable of being compactly sized so that it can be used in a wide range of applications including small diameter boring bars.

SUMMARY OF THE INVENTION

I have surprisingly found that the present invention addresses the foregoing needs in that a toolholder assembly is now provided that has a long lifetime and yet can be made compactly and is also both easily and accurately manufactured.

The present invention is directed to a combination of components for mounting a toolholder into the bore of a tool support member. This combination of components includes the toolholder shank, locking elements and devices for actuating the locking elements. The toolholder shank has a tubular portion which is receivable in the bore of the tool support member. The walls of the tubular portion are perforated at two circumferentially spaced locations. Each of these perforations contains an abutment wall which extends forwardly while extending away from the inner surface of the tubular shank. Each abutment wall registers with a locking element contained within the tubular shank. The locking elements are reciprocally movable into abutment with said abutment wall by a locking element actuator device which includes a reciprocally moving locking rod within a stub member which also holds the locking elements. When the locking rod drives the locking elements radially outwardly so that they abut with the abutment walls in the perforation a rearwardly directed force is applied to the tubular shank while the section of the shank located rearwardly of the abutment wall is resiliently expanded into abutment with the tool support member bore.

Preferably, locking elements have a spherical abutment surface for abutment with the forwardly facing abutment walls in the shank, and each of the forwardly facing abutment walls has a concave surface where the locking elements abut against them. More preferably, each of these concave surfaces has a radius of curvature, $r_c$ which is at least equal to, but no greater than, about 0.004 inches, and more preferably 0.002 inches, larger than the radius of curvature of the spherical surface on each locking element.

It is also preferred that all other surfaces that the locking elements abut against in the locking rod and stub when the locking elements are in the lock up position are concave and more preferably have a radius of curvature equal to, but no greater than, 0.004 inches, and more preferably 0.002 inches, larger than the radius of curvature of the locking elements. Most preferably, the locking elements are spheres.

BRIEF DESCRIPTION OF THE DRAWINGS

The foregoing and other aspects of the present invention will become more apparent upon review of the following detailed description of the invention in conjunction with the drawings which are briefly described below:

FIG. 4 shows a perspective exploded view in partial cross section of the embodiment of the toolholder lock up mechanism and a toolholder support member shown in FIG. 2.

FIG. 5 shows a diametric longitudinal cross section of the forward end of the lock up bar in accordance with the present invention as shown in FIG. 4 viewed along V—V.

DETAILED DESCRIPTION OF THE INVENTION

Figure 1:
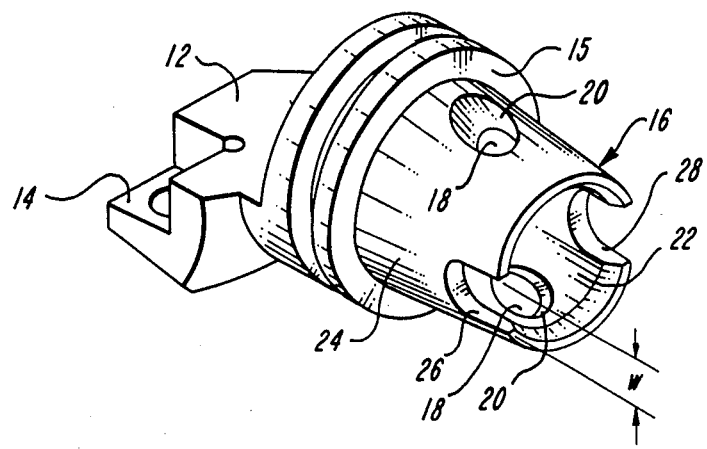
FIG. 1 shows a perspective view of an embodiment of a toolholder in accordance with the present invention.

In accordance with the present invention, FIG. 1 shows an embodiment of a toolholder 10 having a forward end 12 and a rearward tubular shank 16 attached to the forward end 12. On the forward end 12 is a pocket 14 for receiving a cutting tool. The pocket 14 is conventional in design and is designed to receive an indexable cutting insert, locking element and shim (not shown). It should be understood, however, that the present invention is not limited to the forward end design shown in FIG. 1, but includes by way of example and not limitation forward ends having multiple insert seats such as may be found on a milling cutter. In addition, the forward end may be a non-cutting tool.

At the juncture of the forward end 12 and the shank 16 is a rearwardly facing abutment face 15 for abutment with the forwardly facing surface of a tool support member. Preferably, face 15 is planar and is oriented at 90 degrees to the longitudinal center line X—X of shank 16.

As shown in FIG. 1, the tubular shank 16 is preferably an integral part of the toolholder 10, and is preferably machined from a single piece of steel. However, it is also contemplated that the tubular shank 16 and the forward end 12 of the toolholder may be independent pieces that may be subsequently mechanically joined together with the rearwardly facing abutment face 15 being part of either the forward end or the shank. In this manner, a single shank may be utilized with a variety of different toolholders or other tool components.

The shank design of the present invention may also be used in segments, extensions, or assembly components of a modular boring system. In fact, it is envisioned that the present shank design may be used in a plurality of segments to join one segment to the next.

As shown in FIG. 1, the tubular shank 16 has a frusto-conical shape and is perforated at two circumferentially spaced locations by perforations 18, the walls 20 of which communicate with shank inner surface 22 and outer surface 24. While preferably, as shown in FIG. 1, the tubular shank has two perforations 18 circumferentially spaced at 180 degrees to each other, it may be desired in large shank diameters that there be three or four circumferentially spaced perforations 18.

Circumferentially spaced between perforations 18 are slots 26 and 28 on the end of the tubular shank 16. These slots 26 and 28 are designed to serve as keyways to accept keys in the tool support member bore and thereby hold the toolholder nonrotatable with respect to the tool support member. In addition, by locating the slots at the rear end of the tubular shank, the flexibility of the portion of the shank behind the perforations can be readily controlled by changes in the location, size and number of slots. In the embodiment shown in FIG. 1, only slot 26 located in line with the cutting tool receiving pocket 14 is utilized as a keyway to hold the toolholder nonrotatably insofar as the width, w, of slot 26 is dimensioned to provide a slip fit with a key whereas the width of slot 28 is slightly larger (e.g., 0.010 inches greater) than the width of slot 26. This provides the added benefit that the tubular shank can be readily received in a tool support bore provided with two keys in order to accept both right handed and left handed toolholders (i.e., cutting tool pocket on the left or right hand side of the toolholder).

In an alternative embodiment (not shown) the location of the perforations 18 and slots 26 and 28 may be rotated ninety degrees from that shown in FIG. 1 about the longitudinal axis X—X of the shank so that one of the perforations 18 is aligned with the cutting tool receiving pocket 14.

Figure 2:
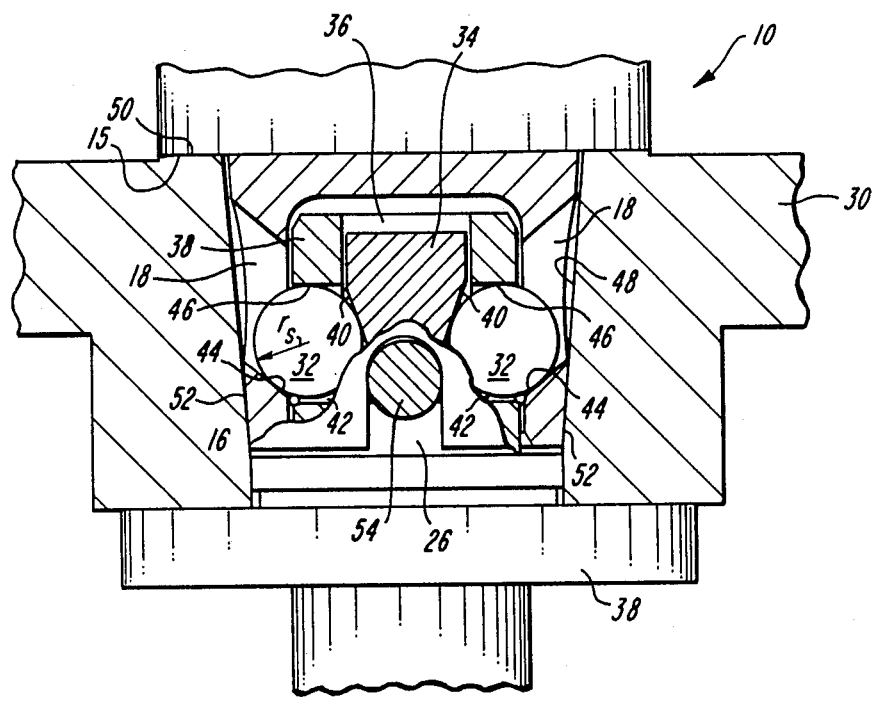
FIG. 2 shows a side plan view of an embodiment of a toolholder assembly in accordance with the present invention in partial cross section.

In accordance with the present invention, the toolholder 10 is mounted on a tool support member 30 via locking elements 32. As shown in FIG. 2., these locking elements 32 preferably are two spherical balls (i.e., spheres) which are held partially within the perforations 18 by a locking rod 34 nonrotatably contained within a longitudinal passageway 36 in stub 38. The locking rod 34 has two cylindrical shaped ramps 40 which drive the balls 32 outwardly through radial apertures 42 in stub 38 when the locking rod 34 is pulled rearwardly as shown in FIG. 2.

As the locking balls are moved outwardly by ramps 40, they are driven into abutment with the forwardly facing abutment surfaces 44 in perforations 18 and rearwardly facing concave surfaces 46 in the radial apertures 42 of the stub 38. In this manner, a rearwardly force is directed against the toolholder 10 such that the rearwardly facing abutment shoulder 15 on the toolholder 10 is placed in pressurized abutment with the forward facing surface 50 of the tool support member 30.

At the same time that this is occurring, the locking elements 32 in addition to exerting a rearwardly directed force also exert an outwardly directed force against the forwardly facing abutment surfaces 44 in apertures 18 and thereby resiliently expand the sections 52 of the shank outer surface 24, located rearwardly of abutment surfaces 44, into abutment with the bore 48 of the tool support member 30.

Also shown in FIG. 2 is the engagement between key member 54 and slot 26 which act to hold the toolholder 10 nonrotatable with respect to the tool support member. These members are circumferentially located at 90 degrees to perforations 18.

These various components of the toolholder assembly, in accordance with the present invention, are shown more clearly in the remaining figures.

Figure 3:
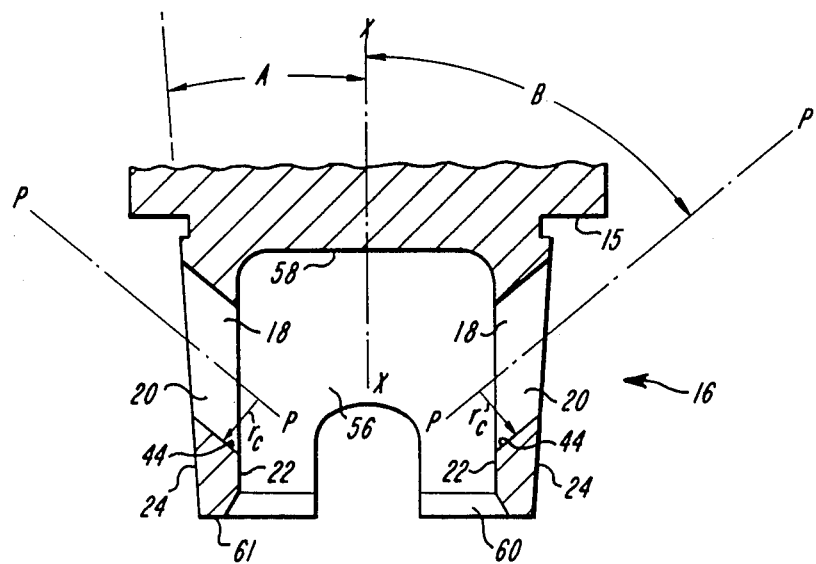
FIG. 3 shows a longitudinal cross section along a diameter of the toolholder shank shown in FIG. 1.

In FIG. 3, which is a cross section taken through the tubular shank 16 along a plane containing a shank diameter and the center lines P—P of perforations 18, it is clearly shown that perforations 18 preferably form walls 20 that are cylindrical in shape and have a radius of curvature $r_c$. These perforations 18 are angled with respect to the longitudinal center line X—X of the shank at an angle B such that the rotational axis of symmetry P—P, and more importantly, forwardly facing concave abutment surfaces 44 on walls 20 extend forwardly while extending away from the inner surface 22 toward the outer surface 24 of the tubular shank 16. While it would be preferred that angle B is as large as possible to maximize mechanical advantage, at large angles, machining tolerances may interfere with the proper locating of the locking elements 32 against surfaces 44. It is, therefore, preferred that angle B is 50 to 60 degrees.

Concave forwardly facing abutment surfaces 44 have a radius of curvature $r_c$, the value of which is determined by the radius of curvature, $r_s$, of the concave abutment surface of the locking elements 32 which will abut against surfaces 44 (see FIG. 2). It is preferred that $r_c$ and $r_s$ be as close as possible to each other so that, when the locking elements 32 are abutted against surfaces 44, contact occurs over as large an area as possible in order to minimize deformation to the surface 44 and to the locking element surface, thereby prolonging their useful lifetimes. Preferably, in order to achieve this result, it is preferred that $r_c$ is equal to, but no greater than, 0.004 inches, and more preferably 0.002 inches, larger than $r_s$.

It is important that the abutment surfaces 44 have the radius and slope described. It is also important that abutment surfaces 44 be at the same height in a direction parallel to the X—X axis to assure lock-up occurs on both abutment surfaces 44. However, the other portions of the perforation walls 20 that are not used for abutment with the locking elements may deviate from the above described relationships without affecting the performance of the present invention. Nonetheless, from the point of view of manufacturing ease, it is preferred that the entire surface of perforation walls 20 have the $r_c$ and B described above in that each perforation 18 may be simply and accurately made by drilling a hole with a twist drill, or by milling a hole with an end mill of the required diameter held at the appropriate angle at the same distance from rearwardly facing abutment face 15.

The outer diameter of the tubular shank 16 decreases as the shank extends rearwardly. Preferably, this decrease is gradual and provides outer surface 24 with a frustoconical shape as shown in FIG. 1. The angle, A, that surface 24 forms with the shank center line X—X, while preferably as small as possible in order to minimize shank diameter for use with small diameter support members (e.g., small diameter boring bars), must be large enough to allow the shank to be easily loaded into the bore 48 of the tool support member 30 which has an angle of taper slightly larger (e.g., 5 minutes of arc) than angle A as shown in FIG. 2. I have found that setting angle A equal to four degrees adequately addresses both concerns.

An internal cavity 56 is formed in tubular shank 16 by inner generally cylindrical surface 22 which is joined by rearwardly facing surface 58 at the forward end of the tubular shank. The cavity 56 has been sized to loosely accept the lock up mechanism shown in FIG. 2. At its rearmost end, surface 22 flares radially outwardly to the rear surface 61 which joins it and outer surface 24. The outwardly flared surface 60 serves to ease loading of the tubular shank 16 over stub 38.

FIG. 4 shows an exploded view of the components shown in FIG. 2, with the toolholder 10 and locking elements 32 removed for clarity. The tool support member 30 is shown having forwardly facing abutment surface 50 perforated by bore 48. The bore surface 62 in the forwardmost section tapers inwardly toward the center line of the bore 48 at an angle which is slightly larger than angle A on the tubular shank 16, as it recedes from forward face 50 until it joins cylindrical bore surface 64. The bore 48 is preferably perforated through its forward tapered surface 62 by two diametrically opposed apertures 66 which hold cylindrical keys 54 which are press fit in apertures 66 and which extend into bore 48. The support member further contains holes 68 (only one of which is shown) for receiving bolts (not shown) for joining support member 30 to a larger machine tool (not shown), such as a lathe turret, boring bar, etc. It should be further understood that support member 30 may be an integral part of, and not separate as shown, of such a turret, boring bar, etc.

The locking element actuating mechanism includes the lock rod 34 and the stub 38. In accordance with my invention, the lock rod 34 has an abutment member 70 joined to an attachment member. Attachment member is shown here as externally threaded rod 72. The abutment member 70 has an end surface 74 joined to an oppositely facing shoulder 76 by a side surface 78. Preferably, the end surface 74 may be used for abutment against surface 58 of the toolholder 10 when the locking rod is pushed forward to unlock the toolholder 10 from the tool support member 30. In this manner, lock rod 34 and end surface 74 may be used to lift the toolholder 10 off the support member 30.

Side surface 78 is a cylindrical surface which has been intersected by radially outward facing concave surface depressions 80 which are equidistant from end surface 74 and circumferentially spaced at 180 degrees to each other. These depressions 80 have been dimensioned to receive locking elements 32 in the unlocked position. The depressions 80 as shown are elongated in the direction of the longitudinal axis Y—Y and preferably have a concave spherical surface at each longitudinal end with a radius $r_1$ that is equal to or slightly larger than the radius of the locking element 32. The radial depth of depressions 80 into cylindrical side surface 78 is set so that the sum of the thickness of lock rod material separating depressions 80 plus the two diameters of the locking elements 32 is less than the internal diameter of the tubular shank.

As most clearly shown in FIG. 5, joining depressions 80 at the same longitudinal end of each depression are ramps 40, one for each depression 80. Each ramp 40 declines inwardly toward central axis Y—Y as it extends away from end 74 until it joins depressions 80. The surface of ramp 40 is a concave cylindrical surface of revolution having a radius r about an axis Z—Z tilted at an angle C to central axis Y—Y. Radius r is again equal to or slightly larger than the radius of the locking element 32 and is preferably no greater than 0.004 inches, and more preferably 0.002 inches, larger than $r_s$.

While angle C should ideally be as small as possible to maximize mechanical advantage, this ideal configuration must be balanced against the ability to manufacture within a given tolerance and the concern that the shallower C is the longer the ramp becomes and the longer the lock rod must be. I have found that setting angle C equal to 20 degrees to be a preferred compromise between these competing concerns, with angle C being equal to 15 degrees being more preferred.

The radial depth into the lock rod at which the ramps 40 intersect depressions 80 is deep enough to assure that the lock up always takes place on ramps 40 and not at the intersection of the ramps 40 and the depressions 80 or within depressions 80. However, the maximum value that the aforementioned radial depth may be designed to have is preferably limited in order to reduce the length of travel of the lock rod required to achieve lock up.

As shown in FIGS. 2 and 4, the diameter of lock rod 34 has been dimensioned to loosely engage in longitudinal passageway 36 communicating between the front surface 82 and the rear surface 84 of stub 38. When engaged in passageway 36, lock rod 34 is held nonrotatable by the engagement of keyway 86 and key 88 which extends into passageway 36. Key 88 may be a set screw 90 threadedly engaged with a threaded radial aperture 92 in stub 38.

When engaged in the stub 38, the lock rod is reciprocally movable forwardly and rearwardly and is held captive between forward facing annular shoulder 94 and key 88. It should be understood, however, that in alternative embodiments the means by which the lock rod 34 is held nonrotatable and captive within the stub 38 may be by members external to the lock rod 34 and/or stub 38.

When fully engaged in the stub 38, the threaded rod 72 of the lock rod 34 is engaged with another member (not shown) which will act to reciprocate the lock rod forwardly, for unlocking, and rearwardly, for locking. In addition, when fully engaged in stub 38, the diametrically opposed depressions 80 will align with diametrically opposed radial apertures 42 which communicate between the side surface 96 of stub 38 and passageway 36, when the lock rod 34 is in the unlocked position. In the locked position, ramps 40 will align with apertures 42 as shown in FIG. 2.

An annular groove 98 is formed in side surface 96 in a location on the stub 38 such that it intersects the rearward end of apertures 42. Contained in the groove 98 is an elastomeric O ring 100 which is used to retain the locking balls 32 with apertures 42 when in the unlocked position.

Flange 102 of the stub 38 is pierced by longitudinal holes (not shown) for accepting bolts (not shown) for mounting the stub 38 on the tool support member 30.

The combination of locking elements 32, locking rod 34 and stub 38 forms the locking mechanism, and this mechanism is then joined to a tool support member 30 via bolts which are not shown. The locking mechanism sits within a tapered bore of the tool support member. The tapered bore preferably contains two keys 54 which are located at 180 degrees to each other and at 90 degrees to the locking elements 32. Keys 54 fit within the slots 24 and 26 on the end of the tubular shank 16.

Additional preferred embodiments of shanks, toolholders and other components are described in my copending application Ser. Nos. 007,070; 007,169, 007,309 and 007,310 filed concurrently with the present application.

All patents and patent applications previously referred to in this application are hereby incorporated by reference.

Changes and modifications in the specifically described embodiments can be carried out without departing from the scope of the invention which is intended to be limited only by the scope of the appended claims.

What is claimed is:

1. A combination for mounting a toolholder into a bore in a forwardly facing surface of a tool support member, said combination comprising:
   said toolholder;
   a first and a second locking element;
   and a means for actuating said first and second locking elements;
   said toolholder having a tubular shank portion open at one end and extending rearwardly into the bore of said tool support member;
   said tubular shank portion perforated by a first and a second perforation at two circumferentially spaced locations;
   a first forwardly facing wall in said first perforation extending forwardly while extending away from the inner surface of said tubular shank toward the outer surface of said tubular shank;
   a second forwardly facing wall in said second perforation extending forwardly while extending away from the inner surface of said tubular shank toward the outer surface of said tubular shank;
   said first locking element and a second locking element in alignment with said first and said second perforations, respectively;
   said locking element actuator means including a reciprocally movable element positioned within said tubular shank portion for driving said first and said second locking elements into engagement with said first and second forwardly facing walls thereby a rearwardly force is directed against said toolholder and a section of said tubular shank located rearwardly of said forwardly facing walls is expanded into abutment with said bore of said tool support member.

2. The combination according to claim 1 wherein said first and said second locking elements each have a spherical surface for abutment with said first and said second forwardly facing walls, and said first and said second forwardly facing walls each has concave surface at the location where said locking element abuts against said forwardly facing wall.

3. The combination according to claim 2 wherein each of said concave surfaces has a radius of curvature, $r_c$, which is at least equal to, but no greater than, about 0.004 inches larger than the radius of curvature $r_s$ of said spherical surface.

4. The combination according to claim 1 wherein said first and said second locking elements are spheres.

5. The combination according to claim 2 wherein said first and said second locking elements are spheres.

6. The combination according to claim 3 wherein said first and said second locking elements are spheres.

7. The combination according to claim 1 further comprising:
   said tool support member having said toolholder, said locking elements and said means for actuating said locking elements within said bore.

8. The combination according to claim 1 wherein said toolholder includes a rearwardly facing face for abutment with said forwardly facing surface of the tool support member and whereby when said rearwardly force is directed against said toolholder by said first and second locking elements, said rearwardly facing face is placed in pressurized abutment with said forwardly facing surface.

9. The combination according to claim 7 wherein said toolholder includes a rearwardly facing face for abutment with said forwardly facing surface of the tool support member and whereby when said rearwardly force is directed against said toolholder by said first and second locking elements, said rearwardly facing face is placed in pressurized abutment with said forwardly facing surface.

10. The combination according to claim 1 further comprising a fastening means; and wherein said locking element actuator means further includes a stub member having a passageway in which said reciprocally movable element is engaged, and a first and a second radial aperture in which said first and second locking elements are respectively engaged;
    said first and said second radial apertures registering with said first and said second perforations, and intersecting said passageway;
    a first and a second rearwardly facing abutment surface in said first and said second radial aperture, respectively, for abutment with said first and said second locking elements, respectively, when said locking elements are driven into engagement with said first and said second forwardly facing walls, respectively;
    and said fastening means holding said stub stationary with respect to said tool support member.

11. The combination according to claim 10 wherein said first and said second rearward abutment surfaces are concave.

12. The combination according to claim 1 wherein said reciprocally movable element includes a first and a second ramp for said driving of said first and second locking elements, respectively.

13. The combination according to claim 12 wherein said first and second ramp have first and second concave cylindrical surfaces of revolution for said driving of said first and second locking elements.

14. The combination according to claim 10 wherein said reciprocally movable element includes a first and a second ramp for said driving of said first and second locking elements, respectively.

15. The combination according to claim 14 wherein said first and second ramp have first and second concave cylindrical surfaces of revolution for said driving of said first and second locking elements.

16. The combination according to claim 15 wherein said first and said second rearward abutment surfaces are concave.

17. A combination for mounting a toolholder into a bore in a forwardly facing surface of a tool support member, said combination comprising:

said toolholder;

said toolholder having a tubular shank portion open at one end and extending rearwardly into the bore of said tool support member;

said toolholder having a forward end having a tool receiving means thereon;

said toolholder having a rearwardly facing abutment face for abutment with the forwardly facing surface of said tool support member;

said tubular shank portion connected to said rearwardly facing abutment face and said forward end;

said tubular shank portion perforated by a first perforation and a second perforation at 180 degrees to said first perforation;

a first forwardly facing cylindrical concave abutment surface in said first perforation and a second forwardly facing cylindrical concave abutment surface in said second perforation;

said first and said second concave abutment surfaces extending forwardly while extending away from the inner surface of said tubular shank portion;

the outer diameter of said tubular shank portion decreasing as said tubular shank portion extends rearwardly;

said toolholder having a means for holding said toolholder nonrotatable with respect to said tool support member;

a first spherical locking element and a second spherical locking element;

a means for actuating said first and said second spherical locking elements;

said means for actuating having a reciprocally movable element and a stub;

said stub having a passageway in which said reciprocally movable element is engaged and a first and a second radial concave cylindrical aperture in which said first and said second locking elements are respectively engaged;

said concave cylindrical apertures registering with said first and said second perforations, intersecting said passageway and having a first and a second rearwardly facing concave cylindrical abutment surface, respectively;

said reciprocally movable element having a first and a second concave cylindrical ramp for respective abutment with said first and second spherical locking elements;

wherein when said reciprocally movable element is moved to and held in a first position said first and second spherical locking elements are respectively held in abutment with said first and second concave cylindrical ramps, said first and said second rearwardly facing concave cylindrical abutment surfaces, and said first and said second forwardly facing cylindrical concave abutment surfaces, whereby a section of said tubular shank located rearwardly of said forwardly facing walls has been expanded into abutment with said bore of said tool support member and said rearwardly facing abutment face of said toolholder has been placed in pressurized abutment with said forwardly facing surface of said tool support member.

18. The combination according to claim 17 wherein the radii of curvature of said first and said second forwardly facing cylindrical concave abutment surfaces, said first and said second rearwardly facing concave abutment surfaces, and said first and said second cylindrical ramps are at least equal to, but no greater than, about 0.004 inches larger than the radius of curvature of said first and said second spherical locking elements, respectively.

19. The combination according to claim 17 wherein the radii of curvature of said first and said second forwardly facing cylindrical concave abutment surfaces, said first and said second rearwardly facing concave abutment surfaces, and said first and said second cylindrical ramps are at least equal to, but no greater than, about 0.002 inches larger than the radius of curvature of said first and said second spherical locking elements, respectively.

20. The combination according to claim 2 wherein each of said concave surfaces has a radius of curvature, $r_c$, which is at least equal to, but no greater than, about 0.002 inches larger than the radius of curvature, $r_s$, of said spherical surface.

* * * * *